(12) United States Patent
Park et al.

(10) Patent No.: US 12,366,680 B2
(45) Date of Patent: Jul. 22, 2025

(54) DISPLAY SYSTEM INCLUDING METAMATERIAL MEMBER AND MANUFACTURING METHOD OF NANOSTRUCTURE OF METAMATERIAL MEMBER

(71) Applicant: Samsung Display Co., LTD., Yongin-si (KR)

(72) Inventors: Yong Jun Park, Yongin-si (KR); Young Suk Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 176 days.

(21) Appl. No.: 18/228,785

(22) Filed: Aug. 1, 2023

(65) Prior Publication Data

US 2024/0125977 A1   Apr. 18, 2024

(30) Foreign Application Priority Data

Oct. 14, 2022   (KR) .................. 10-2022-0132695

(51) Int. Cl.
   *G02B 1/00*   (2006.01)
   *G03B 21/60*  (2014.01)

(52) U.S. Cl.
   CPC ............. *G02B 1/007* (2013.01); *G03B 21/60* (2013.01)

(58) Field of Classification Search
   CPC ............................................. G02B 21/56–625
   See application file for complete search history.

(56) References Cited

U.S. PATENT DOCUMENTS

| | | | |
|---|---|---|---|
| 11,620,732 B2 * | 4/2023 | Aoyanagi | H04N 9/3182 |
| | | | 382/275 |
| 2021/0048683 A1 * | 2/2021 | Wood | G02B 30/52 |

FOREIGN PATENT DOCUMENTS

| | | | |
|---|---|---|---|
| KR | 20070012631 A | | 1/2007 |
| KR | 2007105568 A | * | 10/2007 |
| KR | 100928027 B1 | | 11/2009 |
| KR | 20170075668 A | | 7/2017 |
| KR | 20180062317 A | | 6/2018 |
| KR | 20190111292 A | | 10/2019 |

* cited by examiner

Primary Examiner — Leon W Rhodes, Jr.
(74) Attorney, Agent, or Firm — CANTOR COLBURN LLP (57) ABSTRACT

A display system according to an embodiment includes: an image projector including at least one optical member; a screen including at least one optical member; and a peripheral device. The at least one optical member of the image projector and the at least one optical member of the screen include a metamaterial member having a negative refractive index.

20 Claims, 8 Drawing Sheets

DISPLAY SYSTEM INCLUDING METAMATERIAL MEMBER AND MANUFACTURING METHOD OF NANOSTRUCTURE OF METAMATERIAL MEMBER

This application claims priority to Korean Patent Application No. 10-2022-0132695, filed on Oct. 14, 2022, and all the benefits accruing therefrom under 35 U.S.C. § 119, the content of which in its entirety is herein incorporated by reference.

BACKGROUND

(a) Technical Field

The present disclosure relates to a display system including a metamaterial member and a manufacturing method of a nanostructure of the metamaterial member.

(b) Description of the Related Art

A metamaterial may be implemented as an artificial structure (that is, a metamaterial member) designed to have a property not yet found in nature. The metamaterial generally includes a nanostructure arranged in a repeating pattern. The metamaterial may have a negative refractive index at a specific wavelength of light, an electromagnetic wave, a sound wave, or the like.

In order to form a nanostructure of the metamaterial member, a process of forming a fine pattern is required.

SUMMARY

Embodiments are to provide a manufacturing method of a nanostructure that may easily control a refractive index of the nanostructure of a metamaterial member by easily controlling and forming a shape of a nanostructure portion of the nanostructure such as a height, a thickness, a gap, an inclination angle, or the like of the nanostructure portion. In addition, the embodiments are to provide a lively display system using an optical member including the metamaterial member.

A display system according to an embodiment includes: an image projector including at least one optical member; a screen including at least one optical member; and a peripheral device. The at least one optical member of the image projector and the at least one optical member of the screen comprise a metamaterial member having a negative refractive index.

The peripheral device may be disposed at a middle of an output area between the image projector and the screen.

The peripheral device may include a speaker.

The at least one optical member of the image projector may include a first optical member and a second optical member arranged in a first direction, and each of the first optical member and the second optical member may include a lens.

The at least one optical member of the screen may include a third optical member and a fourth optical member arranged in the first direction, and each of the third optical member and the fourth optical member may include a lens.

At least some area of the output area between the image projector and the screen may include a transparent area, and the peripheral device disposed at the transparent area may not interfere with an image displayed on the screen.

The metamaterial member may include: a first substrate and a second substrate facing each other; and a nanostructure disposed between the first substrate and the second substrate.

The nanostructure may include a nanostructure layer including a plurality of periodically arranged nanostructure portions, and each of the plurality of nanostructure portions may extend in a third direction forming an inclination angle greater than zero with respect to a second direction perpendicular to a major surface of the first substrate.

The display system may further include a seed pattern layer disposed between the nanostructure layer and the first substrate.

An air gap may be defined between adjacent nanostructure portions of the plurality of nanostructure portions, and an effective refractive index of the nanostructure including the plurality of nanostructure portions and the air gap may be 1.33 or less.

A display system according to another embodiment includes: an image projector including at least one optical member; a screen including at least one optical member; and a peripheral device. At least some area of an output area between the image projector and the screen may include a transparent area, and the peripheral device disposed at the transparent area may not interfere with an image displayed on the screen.

The at least one optical member of the image projector may include a first optical member and a second optical member arranged in a first direction, the at least one optical member of the screen may include a third optical member and a fourth optical member arranged in the first direction, at least one of the first optical member and the second optical member may include a metamaterial member having a first negative refractive index, and at least one of the third optical member and the fourth optical member may include a metamaterial member having a second negative refractive index.

The metamaterial member may include: a first substrate and a second substrate facing each other; and a nanostructure disposed between the first substrate and the second substrate.

The nanostructure may include a nanostructure layer including a plurality of periodically arranged nanostructure portions, and each of the plurality of nanostructure portions may extend in a third direction forming an inclination angle greater than zero with respect to a second direction perpendicular to a major surface of the first substrate.

An air gap may be defined between adjacent nanostructure portions of the plurality of nanostructure portions, and an effective refractive index of the nanostructure including the plurality of nanostructure portions and the air gap may be 1.33 or less.

A manufacturing method of a nanostructure according to an embodiment includes: disposing a substrate within a chamber; spraying a material for deposition from a deposition source toward the substrate in a first direction; and depositing the material for deposition at the substrate in a third direction different from the first direction by spraying a gas from a gas source in a second direction different from the first direction.

The gas source may include: a plurality of gas holes through which the gas is sprayed, and the plurality of gas holes may be arranged in parallel with a direction perpendicular to a major surface of the substrate.

The material for deposition deposited at the substrate may form a plurality of periodically arranged nanostructure portions, and each of the plurality of nanostructure portions may extend in a direction providing an inclination angle greater than zero with respect to a direction perpendicular to a major surface of the substrate.

An air gap may be defined between adjacent nanostructure portions of the plurality of nanostructure portions, and an effective refractive index of the nanostructure including the plurality of nanostructure portions and the air gap may be 1.33 or less.

The nanostructure may further include a plurality of seed patterns disposed between the plurality of nanostructure portions and the substrate.

According to embodiments, it is possible to easily control the refractive index of the nanostructure of the metamaterial member by easily controlling and forming the shape of the nanostructure portion of the nanostructure such as the height, the thickness, the gap, the inclination angle, or the like of the nanostructure portion.

In addition, according to the embodiments, a dynamic display system may be provided using the optical member including the metamaterial member.

DETAILED DESCRIPTION

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

In order to clarify the present disclosure, parts that are not connected with the description will be omitted, and the same elements or equivalents are referred to by the same reference numerals throughout the specification.

Further, since sizes and thicknesses of constituent members shown in the accompanying drawings are arbitrarily given for better understanding and ease of description, the present disclosure is not limited to the illustrated sizes and thicknesses. In the drawings, the thickness of layers, films, panels, regions, etc., are exaggerated for clarity. In the drawings, for better understanding and ease of description, thicknesses of some layers and areas are exaggeratedly displayed.

It will be understood that when an element such as a layer, film, region, or substrate is referred to as being "on" or "above" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. In addition, unless explicitly described to the contrary, the word "comprise", and variations such as "comprises" or "comprising", will be understood to imply the inclusion of stated elements but not the exclusion of any other elements.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Further, in the specification, the phrase "on a plane" means when an object portion is viewed from above, and the phrase "on a cross-section" means when a cross-section taken by vertically cutting an object portion is viewed from the side.

A display system according to an embodiment will be described with reference to FIGS. 1 and 2.

Figure 1:
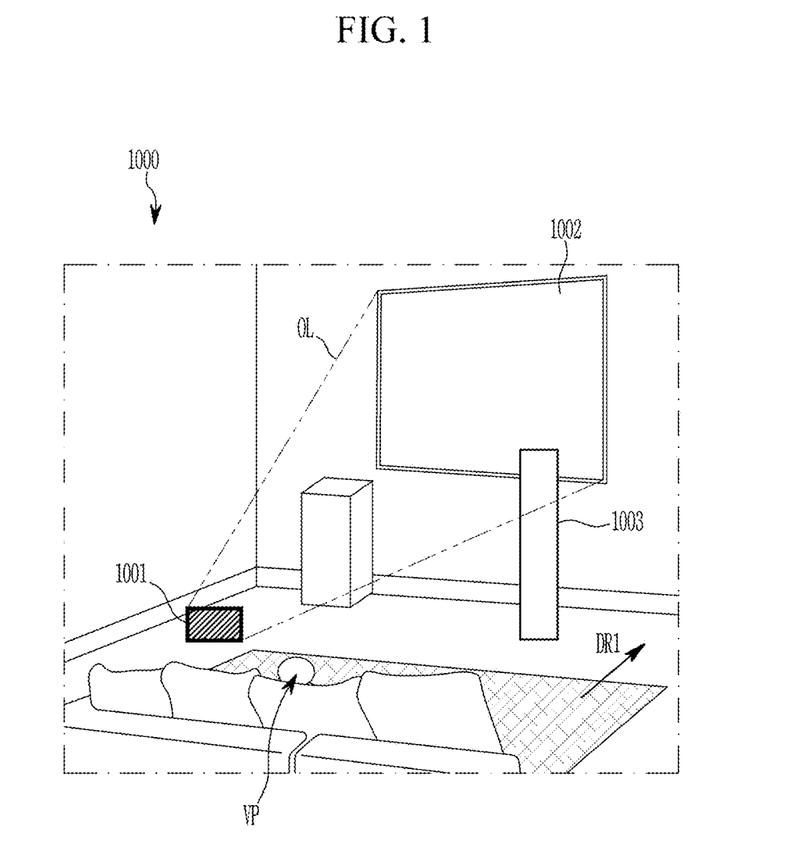
FIG. 1 is an arrangement diagram of a display system according to an embodiment.
Figure 2:
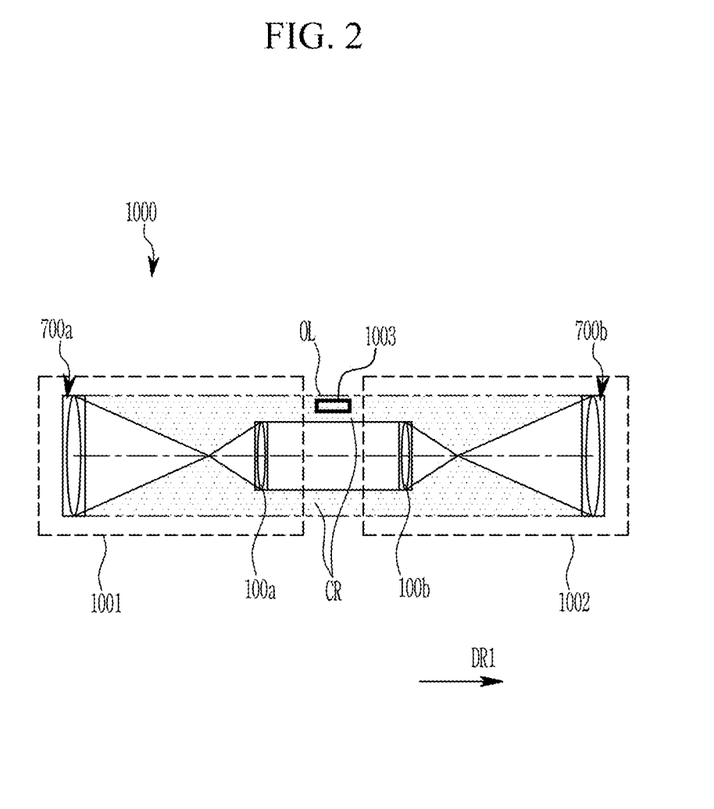
FIG. 2 illustrates an optical member included in the display system according to an embodiment.

FIG. 1 is an arrangement view of the display system according to an embodiment, and FIG. 2 illustrates an optical member included in the display system according to an embodiment.

Referring to FIGS. 1 and 2, the display system 1000 according to the embodiment includes an image projector 1001 for outputting (emitting) light of an image, a screen 1002 capable of displaying the image, and a peripheral device 1003. FIG. 2 does not show a scale of a configuration of the display system 1000 but shows only the arrangement.

The image projector 1001 is also referred to as a beam projector or an image projection device, and may generate image data input from the outside as the image so that the image projector 1001 projects the light of the image mainly in a first direction DR1. The image projector 1001 may use a CRT beam projector, a DLP projector, an LCD projector, a laser projector, an OLED projector, or the like according to a structure for generating the image.

The image projector 1001 may include at least one light source or at least one light emitting part, and at least one optical member including a metamaterial member.

The screen 1002 may display the image projected from the image projector 1001. A user VP may be positioned away from the screen 1002 in the first direction DR1 so that the user VP views the image displayed on the screen 1002.

An area surrounded by a virtual boundary connecting an outer periphery of the image output from the image projector 1001 and an outer periphery of the image displayed on the screen 1002 corresponding to the image output from the image projector is referred to as an output area OL. The output area OL is disposed between the image projector 1001 and the screen 1002, and is an area where the light of the image proceeds if there is no other object between the image projector 1001 and the screen 1002.

The screen 1002 may include at least one optical member including a metamaterial member. The metamaterial member may refer to a member or a structure configured to have a characteristic of a metamaterial.

For example, the peripheral device 1003 is a device (e.g., a speaker) that may assist the user VP in viewing the image. In general, the peripheral device 1003 is not disposed in the output area OL between the image projector 1001 and the screen 1002 so as not to disturb the displayed image, but even if the peripheral device 1003 is disposed between the image projector 1001 and the screen 1002 (that is, inside the output area OL) in an embodiment, the peripheral device does not prevent the user VP from observing the image displayed on the screen 1002. Even if the peripheral device 1003 such as the speaker or the like is disposed within the output area OL, the light of the image output from the image projector 1001 may reach the screen 1002 through a path that is not blocked by the peripheral device 1003. That is, even if the peripheral device 1003 is disposed in a certain area inside the output area OL, the user VP may view an entire image projected by the image projector 1001 toward the screen 1002 and displayed on the screen 1002 due to an optical characteristics of the metamaterial member included in the image projector 1001 and the screen 1002.

Referring to FIG. 2, the image projector 1001 included in the display system 1000 according to the embodiment may include at least one optical member 100*a* or 700*a* including the metamaterial member. FIG. 2 illustrates an embodiment in which one image projector 1001 includes two optical members 100*a* and 700*a*, but the number of the optical members in the image projector 1001 is not limited thereto.

The plurality of optical members 100*a* and 700*a* may be arranged in the first direction DR1, but are not limited thereto. Depending on an embodiment, at least one mirror may be further included in the image projector 1001, and the plurality of optical members 100*a* and 700*a* may also be disposed in a direction different from the first direction DR1.

A first optical member 100*a* among the plurality of optical members 100*a* and 700*a* may be disposed closer to the screen 1002 than a second optical member 700*a*.

At least one of the plurality of optical members 100*a* and 700*a* includes a metamaterial member. According to an embodiment, the first optical member 100*a* may include the metamaterial member and the second optical member 700*a* may not include the metamaterial member, or both the first and second optical members 100*a* and 700*a* may include the metamaterial member.

Each of the first optical member 100*a* and the second optical member 700*a* may include at least one convex lens, or may include a compound lens including various types of lenses.

In another embodiment, the plurality of optical members 100*a* and 700*a* may be disposed at an image exit side of the image projector 1001 together. Accordingly, the light of the image immediately before being output from the image projector 1001 may pass through the plurality of optical members 100*a* and 700*a* and then be projected toward the screen 1002.

According to another embodiment, the plurality of optical members 100*a* and 700*a* may be components separated from the image projector 1001. In this case, the plurality of optical members 100*a* and 700*a* may be disposed right in front of an image exit of the image projector 1001 so that the image output by the image projector 1001 passes through the plurality of optical members 100*a* and 700*a* and then is projected toward the screen 1002.

The screen 1002 included in the display system 1000 according to an embodiment may include at least one optical member 100*b* or 700*b* including a metamaterial member. FIG. 2 illustrates an embodiment in which one screen 1002 includes two optical members 100*b* and 700*b*, but the number of optical members in the screen 1002 is not limited thereto.

The plurality of optical members 100*b* and 700*b* may be arranged in the first direction DR1, but are not limited thereto. Depending on an embodiment, at least one mirror may be further included in the screen 1002, and the plurality of optical members 100*b* and 700*b* may also be arranged in a direction different from the first direction DR1.

A third optical member 100*b* among the plurality of optical members 100*b* and 700*b* may be disposed closer to the image projector 1001 than a fourth optical member 700*b*.

At least one of the plurality of optical members 100*b* and 700*b* includes a metamaterial. According to an embodiment, the third optical member 100*b* may include the metamaterial member and the fourth optical member 700*b* may not include the metamaterial member, or both the third and fourth optical members 100*b* and 700*b* may include the metamaterial member.

Each of the third optical member 100*b* and the fourth optical member 700*b* may include at least one convex lens, or may include a compound lens including various types of lenses.

In an embodiment, the plurality of optical members 100*b* and 700*b* may be disposed in front of the screen 1002 (that is, at a front side where the image projected from the image projector 1001 is incident). Accordingly, the light of the image immediately before being displayed on the screen 1002 may pass through the plurality of optical members 100*b* and 700*b* to be displayed on the screen 1002.

According to another embodiment, the plurality of optical members 100*b* and 700*b* may be components separated from the screen 1002. In this case, the plurality of optical members 100*b* and 700*b* may be disposed in front of the screen 1002 (that is, between the screen 1002 and the image projector 1001) so that the image output by the image projector 1001 is displayed at the screen 1002 after passing through the plurality of optical members 100*b* and 700*b*.

Some areas of the output area OL between the image projector 1001 and the screen 1002 may be a transparent area (or a clear region) CR, and an object disposed at the transparent area CR may not interfere with the image displayed on the screen 1002 and may not be visible to the user VP. In FIG. 2, the transparent area CR is an area indicated by hatching. Referring to FIG. 2, the transparent area CR may be formed at a portion of the output area OL between the first optical member 100*a* and the third optical member 100*b*. In FIG. 2, an optically transparent area CR may exist around the two optical members 100*a* and 700*a* of the image projector 1001 and around the two optical members 100*b* and 700*b* of the screen 1002, but since the optically transparent area CR inside the image projector 1001 and the screen 1002 is not disposed within the output area OL outside the image projector 1001 and the second 1002, the optically transparent area CR may not function as an actual transparent area.

A position, a range, or the like of the transparent area CR among the output area OL varies according to a characteristic such as a refractive index or the like of the optical members 100a, 100b, 700a, and 700b.

Even if the peripheral device 1003 such as the speaker is disposed at the transparent area CR, the light of the image may be displayed on the screen 1002 without passing through the peripheral device 1003, and the user VP may see a completely displayed image that is not blocked by the peripheral device 1003. Since the user VP may view the image that is not blocked by the speaker that is the peripheral device 1003 even if the speaker is not disposed around the screen 1002 relative to the user VP and is disposed in front of the user VP, sound reproduced from the speaker may be perceived livelier so that a lively display system is implemented.

In the present embodiment, the metamaterial member included in the configuration of the display system 1000 may have a negative refractive index, and may include a nanostructure.

A structure of the metamaterial member included in the display system according to an embodiment will be described with reference to FIGS. 3 and 4.

Figure 3:
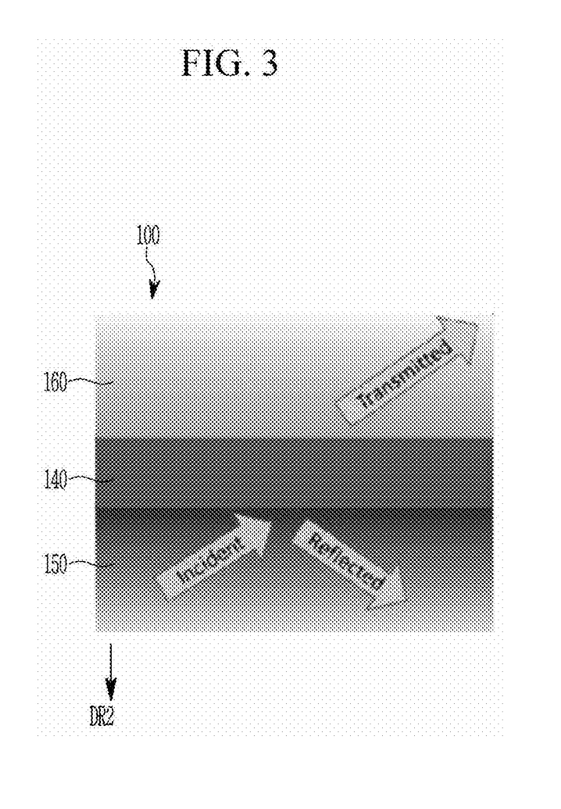
FIG. 3 is a cross-sectional view of a metamaterial member included in the optical member of the display system according to an embodiment.
Figure 4:
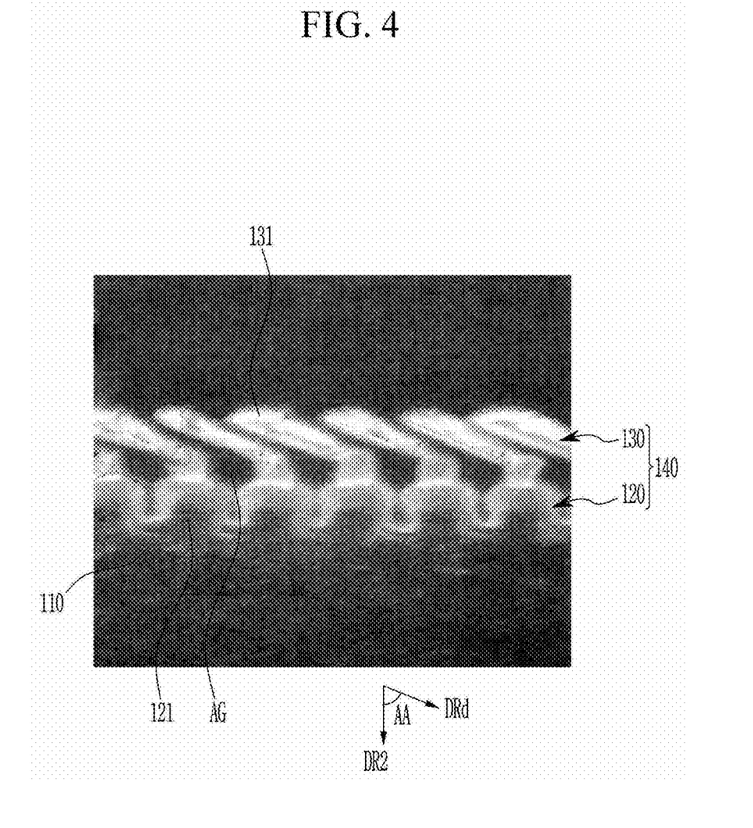
FIG. 4 is a cross-sectional view of a nanostructure of the metamaterial member according to an embodiment.

FIG. 3 is a cross-sectional view of the metamaterial member included in the optical member of the display system according to an embodiment, and FIG. 4 is a cross-sectional view of the nanostructure of the metamaterial member according to an embodiment.

Referring to FIG. 3, the metamaterial member 100 included in the optical member of the display system according to the embodiment may include a first substrate 150, the nanostructure 140, and a second substrate 160.

The nanostructure 140 may be disposed between the first substrate 150 and the second substrate 160 facing each other. Some of light incident to the nanostructure 140 may be reflected, and some of the light may be transmitted and outputted. An effective refractive index of the nanostructure 140 may vary depending on a structure of the nanostructure 140, and the metamaterial member 100 may exhibit a negative refractive index characteristic as a whole according to the effective refractive index of the nanostructure 140 and refractive indices of the first and second substrates 150 and 160.

The first substrate 150, the nanostructure 140, and the second substrate 160 may be stacked in this order in a direction parallel to a second direction DR2.

At least one of the first substrate 150 and the second substrate 160 may be a semiconductor substrate or an insulating substrate. One of the first substrate 150 and the second substrate 160 may have a film shape.

Referring to FIG. 4 together with FIG. 3, the nanostructure 140 includes a plurality of nanostructure portions 131 periodically arranged and a nanostructure layer 130 including an air gap AG.

Each nanostructure portion 131 may have a substantially rod shape, and an inclination direction DRd of the rod shape may form an inclination angle AA greater than 0 degree with respect to the second direction DR2. Here, the second direction DR2 may be a direction perpendicular to a major surface of a substrate 110 on which the nanostructure portion 131 is formed. The inclination angle AA at which the plurality of nanostructure portions 131 are inclined may be substantially constant.

The nanostructure portion 131 may include a silicon oxide ($SiO_x$), and may include magnesium fluoride ($MgF_2$) according to an embodiment.

Referring to FIG. 4, the nanostructure 140 may further include a seed pattern layer 120 disposed below the nanostructure layer 130. The seed pattern layer 120 may include a plurality of seed patterns 121 that each are disposed below each nanostructure portion 131 and are connected to a lower end of each nanostructure portion 131. That is, each nanostructure portion 131 may have a shape extending from an upper end of each seed pattern 121 in an inclined state at the inclination angle AA.

The seed pattern 121 may include a photoresist, but the material of the seed pattern is not limited thereto.

In the present disclosure, the nanostructure 140 is described as including the seed pattern layer 120, but according to another embodiment, the nanostructure 140 includes only the nanostructure layer 130, and the seed pattern layer 120 may be a separate component from the nanostructure 140.

The air gap AG may be defined between adjacent nanostructure portions 131. That is, the adjacent nanostructure portions 131 may be spaced apart by the air gap AG. The air gap AG may be an empty space. An interval between the adjacent nanostructure portions 131 may be approximately several tens of nanometers to several hundreds of nanometers, but the present disclosure is not limited thereto.

The substrate 110 is disposed below the seed pattern layer 120. The substrate 110 may correspond to the first substrate 150 or the second substrate 160 of FIG. 3 described above. As shown in FIG. 4, the substrate 110 may include a plurality of patterns or a plurality of irregularities corresponding to each of the plurality of seed patterns 121, but may have a flat upper surface.

According to an embodiment, the nanostructure 140 including the plurality of periodic nanostructure portions 131 and the air gap AG between the periodic nanostructure portions 131 may have an effective refractive index of 1.33 or less, a refractive index of each of the first substrate 150 and the second nanostructure 140 may be approximately between 1.4 and 1.7, and the effective refractive index of each of the first substrate 150 and the second nanostructure 140 may be about 1.5 as a more specific example. Accordingly, the metamaterial member 100 including the nanostructure 140, the first substrate 150, and the second substrate 160 may exhibit a characteristic of a negative refractive index. The transparent area CR described above may be generated through the plurality of optical members 100a, 100b, 700a, and 700b made of the metamaterial member 100.

An optical characteristic such as a negative refractive index or the like of the metamaterial member 100 may vary depending on a condition such as a shape, the inclination angle AA, a material, a diameter, or an arranged period of the nanostructure portion 131 included in the nanostructure 140, a size of the air gap AG, a material of the first substrate 150, a material of the second substrate 160, or the like. In an embodiment, the negative refractive index of the metamaterial member 100 included in the image projector 1001 may be different from the negative refractive index of the metamaterial member 100 included in the screen 1002.

Now, with reference to FIGS. 5 to 7 together with FIGS. 3 and 4 described above, a manufacturing method of the nanostructure of the metamaterial member according to an embodiment will be described.

Figure 5:
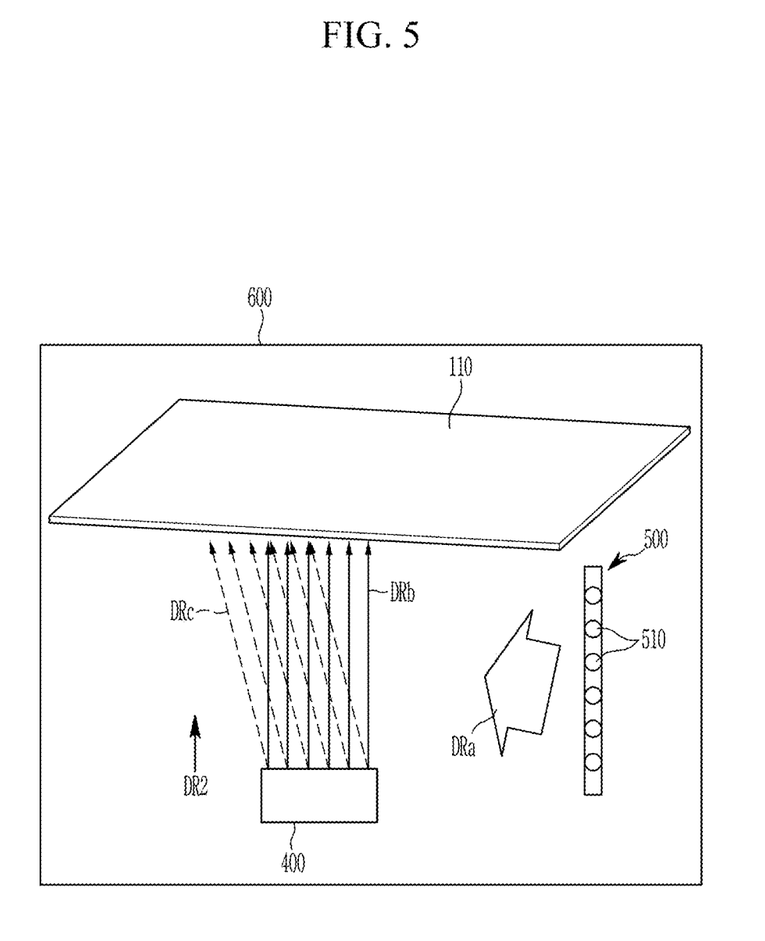
FIG. 5 is a view showing a process of a manufacturing method of the nanostructure of the metamaterial member according to an embodiment.
Figure 6:
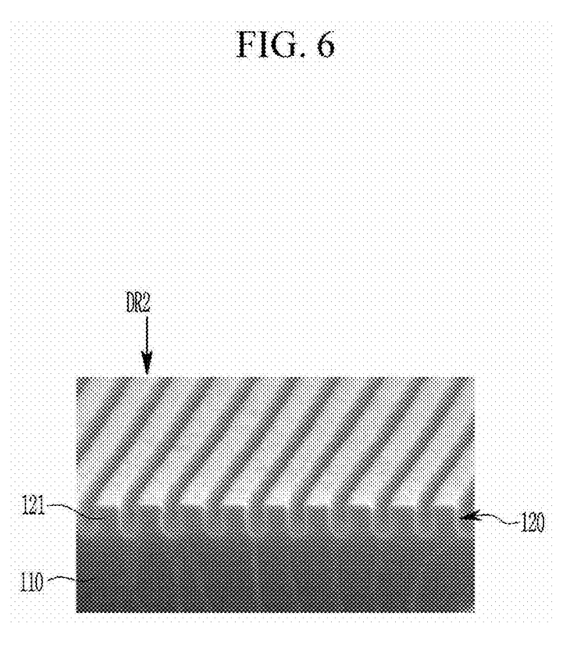
FIG. 6 is a cross-sectional view of a seed pattern in a process step of the manufacturing method of the nanostructure of the metamaterial member according to an embodiment.
Figure 7:
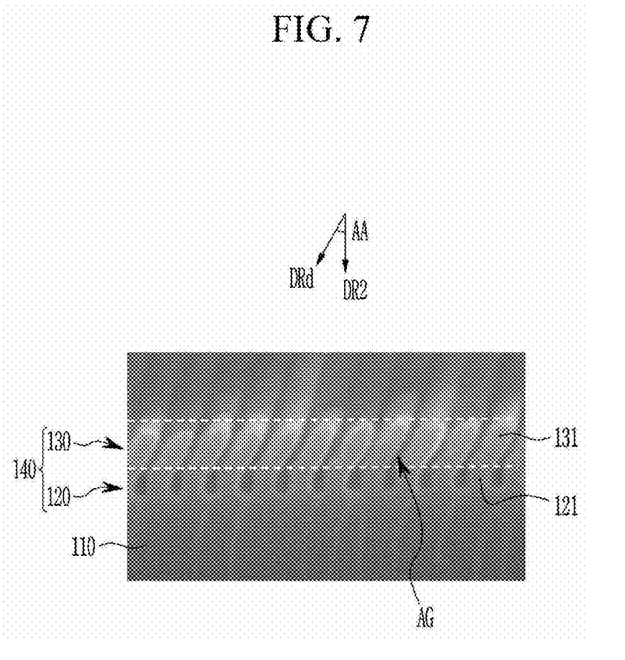
FIG. 7 is a cross-sectional view of a nanostructure formed in a process step of the manufacturing method of the nanostructure of the metamaterial member according to an embodiment.

FIG. 5 is a view showing a process of the manufacturing method of the nanostructure of the metamaterial member according to the embodiment, FIG. 6 is a cross-sectional view of a seed pattern in a process step of the manufacturing method of the nanostructure of the metamaterial member according to an embodiment, and FIG. 7 is a cross-sectional view of a nanostructure formed in a process step of the manufacturing method of the nanostructure of the metamaterial member according to an embodiment.

First, referring to FIG. 5, the substrate 110 is disposed (or placed) within a chamber 600 for a deposition process, and a material (for example, a silicon oxide) for deposition is evaporated or sputtered toward a deposition surface (that is, a lower surface of the substrate 110 of FIG. 5) of the substrate 110 through a deposition source 400 disposed at a side facing the substrate 110 so that a thin film is deposited. For example, the deposition method may use physical vapor deposition ("PVD"), but the present disclosure is not limited thereto.

Referring to FIG. 6, the seed pattern layer 120 including the plurality of seed patterns 121 may be formed at the deposition surface of the substrate 110.

During the deposition process shown in FIG. 5, oxygen gas ($O_2$) may be used as a base gas, and plasma gas may be additionally used to control characteristics of the thin film. A gas such as the plasma gas, the oxygen gas, or the like may flow into the chamber 600 through a gas hole 510 of a gas source 500. In this case, the plasma gas or the oxygen gas may be sprayed (or injected) toward a side at which the material for deposition is evaporated or sputtered.

The gas source 500 may include a plurality of gas holes 510, and the plurality of gas holes 510 may be arranged in parallel with the second direction DR2 perpendicular to a major surface of the substrate 110. In another embodiment, a direction in which the plurality of gas holes 510 are arranged may be a direction inclined with respect to the second direction DR2, but even in this case, the direction in which the plurality of gas holes 510 are arranged is a direction different from a direction (that is, a direction parallel to a major surface of the substrate 110) perpendicular to the second direction DR2. Specifically, an acute angle between the direction in which the plurality of gas holes 510 are arranged and the second direction DR2 may be 0 degrees or more and 45 degrees or less, but a maximum angle is not limited to 45 degrees.

Gas sprayed from the gas source 500 may be sprayed in a gas spray direction DRa substantially perpendicular to the direction in which the plurality of gas holes 510 are arranged. The gas spray direction DRa may be a direction crossing an original spray direction DRb of the material for deposition evaporated or sputtered (sprayed or injected) from the deposition source 400. Due to influence of gas sprayed from the gas source 500, the material for deposition sprayed from the deposition source 400 may be deposited at the deposition surface of the substrate 110 in a final spray direction DRc inclined from the original spray direction DRb to form the thin film. An angle formed between the original spray direction DRb and the final spray direction DRc is greater than 0 degree, and may vary depending on a speed of the gas sprayed from the gas source 500, the gas spray direction DRa, a spraying speed of the material for deposition, or the like.

Accordingly, the material for deposition is deposited on the deposition surface of the substrate 110 in the rod shape extending in the inclination direction DRd providing the inclination angle AA with regard to the second direction DR2 so that the nanostructure layer 130 including the plurality of nanostructure portions 131 is formed. As described above, each nanostructure portion 131 may form the inclination angle AA at the upper end of each seed pattern 121, and may protrude in an inclined shape. The inclination direction DRd in which each nanostructure portion 131 protrudes may be substantially parallel to the final spray direction DRc. The adjacent nanostructure portions 131 may be spaced apart from each other, and the air gap AG may be defined between the adjacent nanostructure portions 131.

A thickness, a gap, and the like of the nanostructure portion 131 may vary depending on a thickness and a gap of the seed pattern 121.

The inclination direction DRd of the nanostructure portion 131 may be controlled by controlling the final spray direction DRc of the material for deposition according to the gas spray direction DRa. The shape such as a height or the like of the nanostructure portion 131 may be controlled by controlling a condition such as a deposition rate, a deposition time, or the like of the deposition process. As described above, it is possible to easily control the effective refractive index of the nanostructure 140 by controlling the shape such as the height, the thickness, the gap, the inclination angle AA, or the like of the nanostructure portion 131, and thus, the metamaterial member 100 may be formed.

Accordingly, the nanostructure 140 including the seed pattern layer 120 and the nanostructure layer 130 may be completed.

According to another embodiment, the original spray direction DRb of the material for deposition sprayed from the deposition source 400 may be inclined with respect to the second direction DR2. In addition, a deposition process may be performed in a state in which the substrate 110 is tilted in a direction in which the material for deposition may be deposited in the inclination direction DRd with respect to a deposition surface of the substrate 110.

Figure 8:
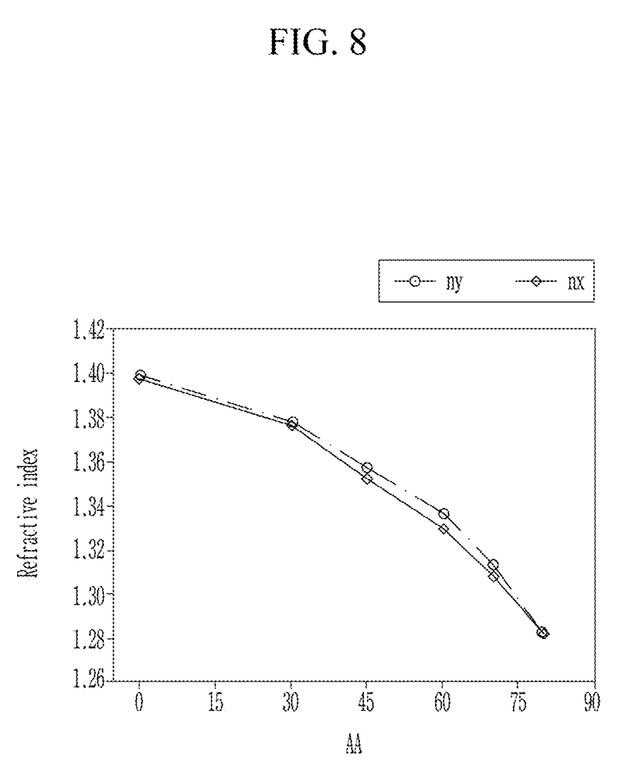
FIG. 8 is a graph showing a change in an effective refractive index of a nanostructure according to an inclined inclination angle of a nanostructure portion of a nanostructure formed by the manufacturing method of the nanostructure according to an embodiment.

FIG. 8 is a graph showing a change in an effective refractive index of a nanostructure according to an inclination angle of a nanostructure portion of a nanostructure formed by the manufacturing method of the nanostructure according to an embodiment. Here, magnesium fluoride ($MgF_2$) is taken as an example of the material for deposition.

Referring to FIG. 8 together with FIGS. 5 to 7, as the inclination angle AA of the nanostructure portion 131 increases, the effective refractive index (nx and ny) of the nanostructure 140 decreases. In particular, when the inclination angle AA is 70 degrees or more, the effective refractive index (nx and ny) of the nanostructure 140 may represent an effective refractive index of about 1.33 or less. Here, a case where a distance between adjacent nanostructure portions 131 is approximately 100 nanometers (nm) is taken as an example. The metamaterial member 100 including the nanostructure 140 may exhibit a negative refractive index as a whole. As described above, according to the embodiment, the refractive index of the nanostructure 140 may be easily controlled by easily controlling and forming a shape (e.g., the height, the thickness, the gap, the inclination angle, or the like) of the nanostructure portion 131 of the nanostructure 140 of the metamaterial member 100. In addition, as described above, it is possible to provide the lively display system using the optical member including the formed metamaterial member.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

DESCRIPTION OF SYMBOLS

100: metamaterial member
100a, 100b, 700a, 700b: optical member
110, 150, 160: substrate
120: seed pattern layer
121: seed pattern
130: nanostructure layer
131: nanostructure portion
140: nanostructure
400: deposition source
500: gas source
510: gas hole
600: chamber
1000: display system
1001: image projector
1002: screen
1003: peripheral device
AG: air gap
CR: transparent area
OL: output area

What is claimed is:

1. A display system comprising:
an image projector including at least one optical member;
a screen including at least one optical member; and
a peripheral device,
wherein the at least one optical member of the image projector and the at least one optical member of the screen comprise a metamaterial member having a negative refractive index.

2. The display system of claim 1, wherein the peripheral device is disposed at a middle of an output area between the image projector and the screen.

3. The display system of claim 2, wherein the peripheral device comprises a speaker.

4. The display system of claim 1, wherein the at least one optical member of the image projector comprises a first optical member and a second optical member that are arranged in a first direction, and
each of the first optical member and the second optical member comprises a lens.

5. The display system of claim 4, wherein the at least one optical member of the screen comprises a third optical member and a fourth optical member that are arranged in the first direction, and
each of the third optical member and the fourth optical member comprises a lens.

6. The display system of claim 5, wherein at least some area of an output area between the image projector and the screen comprises a transparent area, and
the peripheral device disposed at the transparent area does not interfere with an image displayed on the screen.

7. The display system of claim 1, wherein the metamaterial member comprises:
a first substrate and a second substrate facing each other; and
a nanostructure disposed between the first substrate and the second substrate.

8. The display system of claim 7, wherein the nanostructure comprises a nanostructure layer including a plurality of periodically arranged nanostructure portions, and
each of the plurality of nanostructure portions extends in a third direction providing an inclination angle greater than zero with respect to a second direction perpendicular to a major surface of the first substrate.

9. The display system of claim 8, further comprising:
a seed pattern layer disposed between the nanostructure layer and the first substrate.

10. The display system of claim 8, wherein an air gap is defined between adjacent nanostructure portions of the plurality of nanostructure portions, and
an effective refractive index of the nanostructure including the plurality of nanostructure portions and the air gap is 1.33 or less.

11. A display system comprising:
an image projector including at least one optical member;
a screen including at least one optical member; and
a peripheral device,
wherein at least some area of an output area between the image projector and the screen comprises a transparent area, and
the peripheral device disposed at the transparent area does not interfere with an image displayed on the screen.

12. The display system of claim 11, wherein the at least one optical member of the image projector comprises a first optical member and a second optical member that are arranged in a first direction,
the at least one optical member of the screen comprises a third optical member and a fourth optical member that are arranged in the first direction,
at least one of the first optical member and the second optical member comprises a metamaterial member having a first negative refractive index, and
at least one of the third optical member and the fourth optical member comprises a metamaterial member having a second negative refractive index.

13. The display system of claim 12, wherein the metamaterial member comprises:
a first substrate and a second substrate facing each other; and
a nanostructure disposed between the first substrate and the second substrate.

14. The display system of claim 13, wherein the nanostructure comprises a nanostructure layer including a plurality of periodically arranged nanostructure portions, and
each of the plurality of nanostructure portions extends in a third direction providing an inclination angle greater than zero with respect to a second direction perpendicular to a major surface of the first substrate.

15. The display system of claim 14, wherein an air gap is defined between adjacent nanostructure portions of the plurality of nanostructure portions, and
an effective refractive index of the nanostructure including the plurality of nanostructure portions and the air gap is 1.33 or less.

16. A manufacturing method of a nanostructure, comprising:
disposing a substrate within a chamber;
spraying a material for deposition from a deposition source toward the substrate in a first direction; and
depositing the material for deposition at the substrate in a third direction different from the first direction by spraying a gas from a gas source in a second direction different from the first direction.

17. The manufacturing method of claim 16, wherein the gas source comprises a plurality of gas holes through which the gas is sprayed, and the plurality of gas holes are arranged in parallel with a direction perpendicular to a major surface of the substrate.

18. The manufacturing method of claim 16, wherein the material for deposition deposited at the substrate forms a plurality of periodically arranged nanostructure portions, and each of the plurality of nanostructure portions extends in a direction providing an inclination angle greater than zero with respect to a direction perpendicular to a major surface of the substrate.

19. The manufacturing method of claim 18, wherein an air gap is defined between adjacent nanostructure portions of the plurality of nanostructure portions, and an effective refractive index of the nanostructure including the plurality of nanostructure portions and the air gap is 1.33 or less.

20. The manufacturing method of claim 19, wherein the nanostructure further comprises a plurality of seed patterns disposed between the plurality of nanostructure portions and the substrate.

* * * * *